(12) United States Patent
Isaji et al.

(10) Patent No.: US 11,066,599 B2
(45) Date of Patent: Jul. 20, 2021

(54) PRODUCTION METHOD FOR CARBON-BASED LIGHT-EMITTING MATERIAL

(71) Applicant: NISSAN CHEMICAL INDUSTRIES, LTD., Tokyo (JP)

(72) Inventors: Tadayuki Isaji, Funabashi (JP); Naoki Otani, Funabashi (JP); Shinichi Maeda, Funabashi (JP); Masahiro Ueda, Kyoto (JP); Takayoshi Kawasaki, Kyoto (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 260 days.

(21) Appl. No.: 16/072,579

(22) PCT Filed: Jan. 25, 2017

(86) PCT No.: PCT/JP2017/002446
§ 371 (c)(1),
(2) Date: Jul. 25, 2018

(87) PCT Pub. No.: WO2017/130999
PCT Pub. Date: Aug. 3, 2017

(65) Prior Publication Data
US 2019/0055466 A1    Feb. 21, 2019

(30) Foreign Application Priority Data
Jan. 26, 2016  (JP) .............................. JP2016-012258

(51) Int. Cl.
*C09K 11/65*  (2006.01)
*C01B 32/184*  (2017.01)

(52) U.S. Cl.
CPC ............ *C09K 11/65* (2013.01); *C01B 32/184* (2017.08); *C01B 2204/20* (2013.01)

(58) Field of Classification Search
CPC .................................................... C09K 11/65
See application file for complete search history.

(56) References Cited

U.S. PATENT DOCUMENTS

2018/0244991 A1* 8/2018 Hiejima ................. C09K 11/08

FOREIGN PATENT DOCUMENTS

| CN | 103382389 A | 11/2013 |
| CN | 104388083 A | 3/2015 |
| JP | 2015-36389 A | 2/2015 |
| WO | WO 2012/016296 A1 | 2/2012 |
| WO | WO 2014/193089 A1 | 12/2014 |
| WO | WO 2015/106437 A1 | 7/2015 |
| WO | WO 2016/129441 A1 | 8/2016 |

OTHER PUBLICATIONS

Milosavljevic. Microwave preparation of carbon quantum dots with different surface modification. Journal of Metallomics and Nanotechnologies 2014, 3, 16-22 (Year: 2014).*
Sahu. Simple one-step synthesis of highly luminescent carbon dots from orange juice: application as excellent bio-imaging agents. Chem. Commun., 2012, 48, 8835-8837 (Year: 2012).*
Zhang. A Novel One-Step Approach to Synthesize Fluorescent Carbon Nanoparticles. Eur. J. Inorg. Chem. 2010, 4411-4414 (Year: 2010).*
International Search Report dated Feb. 21, 2017, in PCT International Application No. PCT/JP2017/002446, with English translation.
Communication Pursuant to Article 94(3) EPC dated Jan. 22, 2019, in European Patent Application No. 17 744 229.0.
European Search Report dated Jan. 9, 2019, in European Patent Application No. 17744229.0.

* cited by examiner

*Primary Examiner* — Matthew E. Hoban
(74) *Attorney, Agent, or Firm* — Birch, Stewart, Kolasch & Birch, LLP

(57) ABSTRACT

Provided is a production method for a carbon-based light-emitting material that generates light having a wavelength of 500 to 700 nm when exposed to excitation light having a wavelength of 300 to 600 nm. The production method comprises a step for mixing and heating a starting material containing ascorbic acid, an acid catalyst containing an inorganic acid, and a solvent.

7 Claims, No Drawings

PRODUCTION METHOD FOR CARBON-BASED LIGHT-EMITTING MATERIAL

TECHNICAL FIELD

The present invention relates to a method for producing carbonaceous luminescent materials.

BACKGROUND ART

Carbonaceous luminescent materials have been attracting attention recently as light-emitting materials. One type of carbonaceous luminescent material is graphene quantum dots. It is expected that graphene quantum dots will prove to be superior to semiconductor quantum dots in terms of, for example, price, safety and chemical stability. Yet, when it comes to the crucial light-emitting characteristics, semiconductor quantum dots excel at present. In order to take full advantage of the qualities of graphene quantum dots and put them to use as next-generation emitters, improvements need to be made in their optical characteristics.

The inventors have reported a method for producing carbonaceous luminescent materials which exhibit a high quantum yield and have excellent light-emitting characteristics. However, although this method is suitable for the production of carbonaceous luminescent materials that emit blue fluorescence, it is not suitable for the production of carbonaceous luminescent materials that emit red fluorescence.

SUMMARY OF INVENTION

Technical Problem

It is therefore an object of the present invention to provide a method for producing carbonaceous luminescent materials that emit red fluorescence.

Solution to Problem

The inventors have conducted extensive investigations in order to achieve the above object. As a result, they have discovered that a carbonaceous luminescent material can be obtained by mixing together and heating an ascorbic acid-containing starting material, an inorganic acid-containing acid catalyst and a solvent, and that this material emits red fluorescence.

Accordingly, the invention provides the following method for producing carbonaceous luminescent materials.

1. A method for producing a carbonaceous luminescent material that, when exposed to excitation light having a wavelength of 300 to 600 nm, emits light having a wavelength of 550 to 700 nm, which method comprises the step of mixing together and heating an ascorbic acid-containing starting material, an inorganic acid-containing acid catalyst and a solvent.
2. The method for producing a carbonaceous luminescent material of 1 above, wherein the starting material further includes a polycarboxylic acid.
3. The method for producing a carbonaceous luminescent material of 2 above, wherein the polycarboxylic acid is citric acid.
4. The method for producing a carbonaceous luminescent material of any of 1 to 3 above, wherein the starting material further includes an amino group-containing compound.
5. The method for producing a carbonaceous luminescent material of 4 above, wherein the amino group-containing compound is an amino group-containing polyalkylene glycol.
6. The method for producing a carbonaceous luminescent material of 5 above, wherein the amino group-containing compound is an amino group-containing polyethylene glycol.
7. The method for producing a carbonaceous luminescent material of any of 1 to 6 above, wherein the carbonaceous luminescent material has a graphene structure.

Advantageous Effects of Invention

The inventive method for producing a carbonaceous luminescent material makes it possible to produce carbonaceous luminescent materials that emit red fluorescence.

DESCRIPTION OF EMBODIMENTS

The inventive method for producing a carbonaceous luminescent material includes the step of mixing together and heating an ascorbic acid-containing starting material, an inorganic acid-containing acid catalyst and a solvent.

In addition to ascorbic acid, the starting material may also include a polycarboxylic acid. Polycarboxylic acids that may be used as the starting material are not particularly limited, so long as they are carboxylic acids having at least two carboxyl groups. Specific examples include citric acid, oxalic acid, malonic acid, succinic acid, fumaric acid, itaconic acid, malic acid and tartaric acid. Of these, citric acid, succinic acid and oxalic acid are preferred, with citric acid being more preferred. The polycarboxylic acid may be used singly, or two or more may be used in combination.

The amount of the polycarboxylic acid used per 100 parts by weight of the ascorbic acid is preferably from 10 to 1,000 parts by weight, and more preferably from 30 to 300 parts by weight.

In addition to ascorbic acid, the starting material may also include an amino group-containing organic compound. The amino group-containing organic compound is preferably, for example, an amino group-containing polyalkylene glycol, an amino acid or a primary aliphatic amine. Of these, an amino group-containing polyalkylene glycol is especially preferred. The amino group-containing organic compound may be used singly, or two or more may be used in combination.

Examples of amino group-containing polyalkylene glycols include amino group-containing polyethylene glycols and amino group-containing polypropylene glycols. The number of amino groups included on the amino group-containing polyalkylene glycol may be one, two or more. A polyethylene glycol containing a terminal amino group is especially preferred as the amino group-containing polyalkylene glycol. The amino group-containing polyalkylene glycol has a weight-average molecular weight (Mw) of preferably from 300 to 10,000, and more preferably from 500 to 2,000. The Mw is a polystyrene-equivalent measured value obtained by gel permeation chromatography using tetrahydrofuran as the solvent. A commercial product may be used as the amino group-containing polyalkylene glycol.

Examples of the amino acid include glycine, cysteine, alanine, valine, phenylalanine, threonine, lysine, asparagine, tryptophan, serine, glutamic acid, aspartic acid, ornithine, thyroxine, cystine, leucine, isoleucine, proline, tyrosine, glutamine, histidine, methionine and threonine. Of these, preferred examples include glycine and cysteine. In cases where the amino acid has an optical isomer, the amino acid may be the D form or the L form, or may be a racemic body.

The amount of amino group-containing compound used per 100 parts by weight of the ascorbic acid is preferably from 10 to 1,000 parts by weight, and more preferably from 50 to 500 parts by weight.

Organic compounds other than ascorbic acid, polycarboxylic acids and amino group-containing organic compounds may additionally be used as starting materials. Such organic compounds are not particularly limited, so long as they do not interfere with the advantageous effects of the invention.

The acid catalyst includes an inorganic acid. Examples of the inorganic acid include phosphoric acid, polyphosphoric acid, hydrochloric acid, nitric acid, sulfuric acid and hydrofluoric acid. Of these, phosphoric acid and polyphosphoric acid are preferred. The inorganic acid may be used singly, or two or more may be used in combination.

The acid catalyst may optionally include also an acid catalyst other than the above inorganic acids. Examples of such other acid catalysts include sulfonic acid, organic acids such as o-toluenesulfonic acid, cationic ion-exchange resins, cationic ion-exchange membrane, and the solid acid catalysts mentioned in *Nature* 438, p. 178 (2005). A commercial product may be used as the solid acid catalyst. Illustrative examples include the ion exchange resins AMBERLYST® 15, 16, 31 and 35 and AMBERLITE® IR120B, IR124, 200CT and 252 from Rohm and Haas Company, NAFION® ion-exchange membrane from E.I. DuPont de Nemours and Co., and inorganic solid acid catalysts such as zeolite and polyphosphoric acid. Such other acid catalysts may be used singly, or two or more may be used in combination.

In the above acid catalysts, the inorganic acid content is preferably from 10 to 100 wt %, and more preferably from 30 to 100 wt %.

The amount of acid catalyst used per 100 parts by weight of the starting material is preferably from 100 to 10,000 parts by weight, and more preferably from 200 to 5,000 parts by weight.

The solvent is not particularly limited, provided it is one that can dissolve the starting materials that are used. Examples of such solvents include water, dimethylsulfoxide, dimethylformamide, dimethylacetamide, N-methyl-2-pyrrolidone, hexamethylphosphoramide, acetonitrile, acetone, alcohols (methanol, ethanol, 1-propanol, 2-propanol, etc.), glycols (ethylene glycol, triethylene glycol, etc.), cellosolves (ethyl cellosolve, methyl cellosolve, etc.), polyhydric alcohols (glycerol, pentaerythritol, etc.), tetrahydrofuran, toluene, ethyl acetate, butyl acetate, benzene, toluene, xylene, pentane, hexane, heptane, chlorobenzene, dichlorobenzene, trichlorobenzene, hexadecane, benzyl alcohol and oleyl amine. Of these, water and toluene are preferred. The solvent may be used singly, or two or more may be used in admixture.

From the standpoint of preparing a carbonaceous luminescent material of a uniform particle size, the amount of solvent used per 100 parts by weight of the starting material is preferably from 0 to 1,000 parts by weight, and more preferably from 10 to 100 parts by weight.

The inventive production method may be carried out in the presence of a surfactant. Surfactants preferred for this purpose are cationic surfactants, anionic surfactants and nonionic surfactants.

Examples of cationic surfactants include cetyltrimethylammonium bromide and cetyltrimethylammonium chloride. Examples of anionic surfactants include sodium dodecyl sulfate and sodium dodecylbenzene sulfonate. Examples of nonionic surfactants include polyethylene glycol and polypropylene glycol. These surfactants may be used singly, or two or more may be used in combination.

From the standpoint of the critical micelle concentration, which is a synthesis condition, the amount of surfactant used per 100 parts by weight of the starting materials is preferably from 0 to 1,000 parts by weight, and more preferably from 10 to 100 parts by weight.

The production method of the invention is one in which the starting material, the acid catalyst, the solvent and, where necessary, a surfactant are mixed together and heated. The mixture of these ingredients may be carried out in any order. For example, first the starting material and the optional surfactant may be added to the solvent, followed by addition of the acid catalyst. Alternatively, the starting material, the acid catalyst and the optional surfactant may be added at the same time to the solvent.

Heating may be carried out under normal pressure (atmospheric pressure) or under applied pressure. When carried out under applied pressure, use may be made of, for example, an autoclave. By using an autoclave, the reaction temperature can be raised to or above the boiling point at normal pressure. For example, even when water is used as the solvent, by carrying out the reaction using an autoclave, a reaction temperature of about 200° C. can easily be attained.

The applied pressure is not particularly limited, so long as the desired reaction temperature can be attained. In general, the applied pressure is preferably from about 200 kPa to about 2.0 MPa, and more preferably from about 500 kPa to about 1.0 MPa.

When the reaction is carried out at normal pressure, the reaction temperature varies also with the boiling point of the solvent used, but in general is preferably from about 40° C. to about 250° C., more preferably from 60 to 200° C., and even more preferably from 90 to 150° C. Heating is generally carried out in a water bath or an oil bath, although microwave heating can also be carried out.

When the reaction is carried out at normal pressure, the reaction time is preferably from about 1 minute to about 240 hours, more preferably from about 10 minutes to about 48 hours, and even more preferably from about 12 hours to about 30 hours. When the reaction is carried out under applied pressure, the reaction time is preferably from about 1 minute to about 24 hours, more preferably from about 10 minutes to about 12 hours, and even more preferably from about 30 minutes to about 3 hours.

The resulting product can be purified by removing low-molecular-weight impurities by dialysis, ultrafiltration or the like, and subsequently removing high-molecular-weight impurities by centrifugation or the like. The pore size of the dialysis membrane or ultrafiltration membrane and the centrifugal force during centrifugation may be suitably set according to the molecular weight of the substances to be removed.

For purification to a higher purity, column purification may be carried out. The column packing in this case may be a normal-phase packing or a reversed-phase packing. Silica particles, alumina particles and the like may be used as normal-phase packings. Silica particles that are surface-modified with long-chain alkyl groups may be used as a reversed-phase packing. Pressure may be applied during column purification so as to shorten the time.

In terms of chemical stability, luminescence quantum yield, control of the luminescence characteristics, etc., the carbonaceous luminescent material produced by the inventive method is preferably one having a graphene structure.

The carbonaceous luminescent material produced by the method of the invention emits light having a wavelength of 550 to 700 nm when exposed to excitation light having a wavelength of 300 to 600 nm.

EXAMPLES

Working Examples are given below to more concretely illustrate the invention, although the invention is not limited by these Examples. The equipment used was as follows.
(1) Fluorescence Spectrum: FP-6500, from JASCO Corporation
(2) Measurement of Quantum Yield: UV-3600 from Shimadzu Corporation, and
FP-6500 from JASCO Corporation.

Working Example 1

Synthesis of Carbonaceous Luminescent Material 1

A 10 mL sample bottle was charged with 0.2 g of ascorbic acid (03420-65, from Nacalai Tesque Inc.) and 4 mL of phosphoric acid (27618-55, from Nacalai Tesque Inc.; 85 wt % aqueous solution), following which the bottle was tightly stoppered and the contents were reacted for 4 hours at 90° C. on an oil bath. Although the system became black and tarry, Carbonaceous Luminescent Material 1 was obtained as the portion that dissolves in a 85 wt % aqueous phosphoric acid solution.

Working Example 2

Synthesis of Carbonaceous Luminescent Material 2

A 10 mL sample bottle was charged with 0.2 g of ascorbic acid (03420-65, from Nacalai Tesque Inc.), 0.2 g of citric acid (09109-85, from Nacalai Tesque Inc.) and 4 mL of phosphoric acid (27618-55, from Nacalai Tesque Inc.; 85 wt % aqueous solution), following which the bottle was tightly stoppered and the contents were reacted for 12 hours at 90° C. on an oil bath. Although the system became black and tarry, Carbonaceous Luminescent Material 2 was obtained as the portion that dissolves in a 85 wt % aqueous phosphoric acid solution.

Working Example 3

Synthesis of Carbonaceous Luminescent Material 3

A 10 mL sample bottle was charged with 0.2 g of ascorbic acid (03420-65, from Nacalai Tesque Inc.), 1 mL of PEG-NH$_2$ (466627, from Aldrich Co.) and 4 mL of phosphoric acid (27618-55, from Nacalai Tesque Inc.; 85 wt % aqueous solution), following which the bottle was tightly stoppered and the contents were reacted for 4 hours at 90° C. on an oil bath. Although the system became black and tarry, Carbonaceous Luminescent Material 3 was obtained as the portion that dissolves in a 85 wt % aqueous phosphoric acid solution.

Working Example 4

Synthesis of Carbonaceous Luminescent Material 4

A 10 mL sample bottle was charged with 0.2 g of ascorbic acid (03420-65, from Nacalai Tesque Inc.), 0.2 g of citric acid (09109-85, from Nacalai Tesque Inc.), PEG-NH$_2$ (466627, from Aldrich Co.) and 4 mL of phosphoric acid (27618-55, from Nacalai Tesque Inc.; 85 wt % aqueous solution), following which the bottle was tightly stoppered and the contents were reacted for 3 hours at 90° C. on an oil bath. Although the system became black and tarry, Carbonaceous Luminescent Material 4 was obtained as the portion that dissolves in a 85 wt % aqueous phosphoric acid solution.

Comparative Example 1

A 10 mL sample bottle was charged with 0.2 g of citric acid (09109-85, from Nacalai Tesque Inc.) and 4 mL of phosphoric acid (27618-55, from Nacalai Tesque Inc.; 85 wt % aqueous solution), following which the bottle was tightly stoppered and the contents were reacted for 12 hours at 90° C. on an oil bath. However, a material that emits light at a long wavelength was not obtained.

[Measurement of Fluorescence Spectra]

The fluorescence spectra and quantum yields of the carbonaceous luminescent materials obtained in Working Examples 1 to 4 were measured. The results are shown in Table 1.

TABLE 1

| | | Major fluorescence characteristics | | |
|---|---|---|---|---|
| Carbonaceous luminescent material | | Excitation wavelength (nm) | Fluorescence wavelength (nm) | Half-width (nm) |
| Working Example 1 | 1 | 373, 385 | 572, 629 | 10, 20 |
| Working Example 2 | 2 | 373 | 573, 629 | 11, 26 |
| Working Example 3 | 3 | 386, 397 | 596, 651 | 19, 48 |
| Working Example 4 | 4 | 386 | 595, 655 | 18, 56 |

As shown in Table 1, the carbonaceous luminescent materials obtained by the method of the invention emit red fluorescence.

The invention claimed is:
1. A method for producing a carbonaceous luminescent material that, when exposed to excitation light having a wavelength of 300 to 600 nm, emits light having a wavelength of 550 to 700 nm, which method comprises the step of mixing together and heating an ascorbic acid-containing starting material, an inorganic acid-containing acid catalyst and a solvent,
wherein the solvent consists of water.
2. The method for producing a carbonaceous luminescent material of claim 1, wherein the starting material further includes a polycarboxylic acid.
3. The method for producing a carbonaceous luminescent material of claim 2, wherein the polycarboxylic acid is citric acid.
4. The method for producing a carbonaceous luminescent material of any one of claims 1 to 3, wherein the starting material further includes an amino group-containing compound.
5. The method for producing a carbonaceous luminescent material of claim 4, wherein the amino group-containing compound is an amino group-containing polyalkylene glycol.
6. The method for producing a carbonaceous luminescent material of claim 5, wherein the amino group-containing compound is an amino group-containing polyethylene glycol.

7. The method for producing a carbonaceous luminescent material of claim 1, wherein the carbonaceous luminescent material has a graphene structure.

\* \* \* \* \*